(12) United States Patent
Phan et al.

(10) Patent No.: US 9,321,852 B2
(45) Date of Patent: Apr. 26, 2016

(54) POLYSACCHARIDE DERIVATIVES AND STRUCTURES EMPLOYING SAME

(71) Applicant: The Procter & Gamble Company, Cincinnati, OH (US)

(72) Inventors: Dean Van Phan, Orlando, FL (US); Robert Lee Barcus, Cincinnati, OH (US); Alyssandrea Hope Hamad-Ebrahimpour, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 194 days.

(21) Appl. No.: 14/073,935

(22) Filed: Nov. 7, 2013

(65) Prior Publication Data

US 2014/0057106 A1    Feb. 27, 2014

Related U.S. Application Data

(63) Continuation of application No. 11/931,654, filed on Oct. 31, 2007, now abandoned.

(60) Provisional application No. 60/875,934, filed on Dec. 20, 2006, provisional application No. 60/897,768, filed on Jan. 26, 2007.

(51) Int. Cl.
| | |
|---|---|
| *C08B 37/14* | (2006.01) |
| *D01F 8/18* | (2006.01) |
| *A61L 15/28* | (2006.01) |
| *C08B 37/00* | (2006.01) |
| *D01F 2/00* | (2006.01) |
| *D01F 9/00* | (2006.01) |
| *D01C 1/00* | (2006.01) |

(52) U.S. Cl.
CPC .......... *C08B 37/006* (2013.01); *C08B 37/0057* (2013.01); *D01F 2/00* (2013.01); *D01F 9/00* (2013.01); *Y10T 428/298* (2015.01)

(58) Field of Classification Search
CPC ............................. C08B 37/0057; D01F 8/18
See application file for complete search history.

(56) References Cited

U.S. PATENT DOCUMENTS

| | | | |
|---|---|---|---|
| 2,523,708 A | 9/1950 | Owen | |
| 3,325,472 A | 6/1967 | Sackler et al. | |
| 3,679,658 A | 7/1972 | Yueh | |
| 3,835,112 A | 9/1974 | Mardiguian et al. | |
| 3,846,403 A | 11/1974 | Gibney et al. | |
| 4,734,162 A * | 3/1988 | Ampulski | 162/84 |
| 2008/0154225 A1 | 6/2008 | Phan | |
| 2008/0234476 A1 | 9/2008 | Phan et al. | |

FOREIGN PATENT DOCUMENTS

| | | |
|---|---|---|
| DE | 1108198 B | 6/1961 |
| EP | 406 685 A1 | 1/1991 |
| GB | 723630 A | 2/1955 |
| WO | WO 98/17386 A1 | 4/1998 |
| WO | WO 2006/072119 A2 | 7/2006 |

OTHER PUBLICATIONS

English machine translation of WO2006072119, http://worldwide.espacenet.com/, accessed online on Jul. 16, 2015.*
Carson, et al., "Esters of Lima Bean Pod and Corn Cob Hemicelluloses", *Journal of the American Chemical Society*, vol. 70, pp. 293-295, (1948).
Definition of Derivative, Oxford English Dictionary, http://dictionary.oed.com, accessed online on May 20, 2010.
Fundador, et al., "Syntheses and Characterization of Xylan Esters", *Polymer*, vol. 53, pp. 3885-3893 (2012).
Greffe, et al., "Synthesis, Preliminary Characterization, and Application of Novel Surfactants from Highly Branched Xyloglucan Oligosaccharides", *Glycobiology*, vol. 15, No. 4, pp. 437-445 (2005).
Hansen, et al., "Synthesis and Characterization of Birch Wood Xylan Succinolyated in 1-n-Butyl-3-Methylimidazolim Cholride", *Polymer Chemistry*, vol. 2, p. 2010 (2011).
Hartman, et al., "Surface- and Bulk-Modified Galactoglucomannan Hemicelluloe Films and Film Laminates for Verstile Oxygen Barriers", *Biomacromolecules*, vol. 7, pp. 1983-1989 (May 3, 2006).
Jain, et al., "Thermoplastic Xylan Derivatives with Propylene Oxide", *Cellulose*, vol. 7, pp. 319-336 (2001).
Park, et al., "Synthesis and Characterization of SPUU-PEO-Heparin Graft Copolymers", *Journal of Polymer Science: Part A: Polymer Chemistry*, vol. 29, pp. 1725-1737 (1991).
Salam, et al., "Incorporation of Carboxyl Groups into Xylan for Improved Absorbency", *Cellulose*, vol. 18, pp. 1033-1041 (2011).
Sjöholm, et al., "Influence of the Carbohydrated Composition on the Molecular Weight Distribution of Kraft Pulps", *Carbohydrate Polymers*, vol. 41, pp. 1-7 (2000).
Sjostrom, E., "Wood Polysaccharides", *Wood Chemistry. Fundamentals and Applications*, $2^{nd}$ Edition, pp. 51-70 (1993).
Timmel, T. E., "Recent Progress in the Chemistry of Wood Hemicelluloses", *Wood Science and Technology*, vol. 1, pp. 45-70 (1967).
Xu, et al., "Analysis and Characterization of Acetylated Sugarcane Bagasse Hemicelluloses", *International Journal of Polymer Anal. Charact.*, vol. 9, pp. 229-244 (2004).

* cited by examiner

*Primary Examiner* — Jonathan S Lau
(74) *Attorney, Agent, or Firm* — Roddy M. Bullock (57) ABSTRACT

Polysaccharide derivatives, more particularly heteropolysaccharide derivatives, especially hemicellulose derivatives, methods for making same and structures employing same are provided.

18 Claims, 1 Drawing Sheet

POLYSACCHARIDE DERIVATIVES AND STRUCTURES EMPLOYING SAME

FIELD OF THE INVENTION

The present invention relates to polysaccharide derivatives, more particularly to heteropolysaccharide derivatives, especially hemicellulose derivatives, methods for making same and structures employing same.

BACKGROUND OF THE INVENTION

Derivatives of polysaccharides are known in the art. In the past, formulators have derivatized polysaccharides in order to impact certain properties of the polysaccharides. For example, formulators have made cellulose acetates and/or cellulose fatty acid esters in order to improve the thermoplastic properties of cellulose. Further, formulators have made heteropolysaccharide derivatives; namely, ester and/or ether derivatives of xylan in order to improve the thermoplastic properties of xylan. However, such cellulose and xylan derivatives exhibit hydrophobic and/or hydrophilic properties that limit the usefulness of such derivatives for product applications that come into contact with free water.

Accordingly, there is a need for polysaccharide derivatives that are suitable for use in product applications that come into contact with free water.

SUMMARY OF THE INVENTION

The present invention fulfills the needs described above by providing polysaccharide derivatives that are suitable for use in product applications (structures) that come into contact with free water, methods for making same and structures employing same. "Suitable for use in product applications that come into contact with free water" as used herein means that the polysaccharide derivatives do not make the product applications consumer unacceptable for their intended use. In one example, the polysaccharide derivatives exhibit properties suitable for forming structures, such as films and/or fibers. Such films and/or fibers can be employed as packaging films and/or sanitary tissue products. In such a case, it is desirable that the polysaccharide derivatives exhibit properties that consumers of such packaging films and/or sanitary tissue products desire. For example, consumers of sanitary tissue products, such as paper towels, desire the products to not be too hydrophobic and to absorb free water.

In one example of the present invention, a polysaccharide derivative that exhibits a contact angle of less than about 60° as determined by the Contact Angle Test Method described herein, is provided. In one example, such a polysaccharide derivative is suitable for use in product applications that come into contact with free water.

In another example of the present invention, a thermoplastic polysaccharide derivative that exhibits a contact angle of less than about 60° as determined by the Contact Angle Test Method described herein, is provided.

In another example of the present invention, a heteropolysaccharide derivative comprising a non-aromatic moiety wherein the heteropolysaccharide derivative exhibits a contact angle of less than about 150° as determined by the Contact Angle Test Method, is provided.

In another example of the present invention, a heteropolysaccharide derivative that exhibits a degree of polymerization of greater than 310 as determined by the Degree of Polymerization Test Method described herein, is provided.

In even another example of the present invention, a method for making a polysaccharide derivative according to the present invention is provided.

In still another example of the present invention, a method for making a heteropolysaccharide derivative according to the present invention is provided.

In yet another example of the present invention, a structure, such as a fiber and/or a film and/or a fibrous structure, comprising a polysaccharide derivative is provided.

In still yet another example of the present invention, a structure, such as a fiber and/or a film and/or a fibrous structure, comprising a heteropolysaccharide derivative is provided.

In even yet another example of the present invention, a method for making a structure according to the present invention is provided.

Accordingly, the present invention provides a polysaccharide derivative; a heteropolysaccharide derivative; methods for making such polysaccharide and/or heteropolysaccharide derivatives; and structure comprising such polysaccharide and/or heteropolysaccharide derivatives.

DETAILED DESCRIPTION OF THE INVENTION

"Polysaccharide" as used herein means a polymer comprising a plurality of monosaccharides (sugar units), typically pentose and/or hexose sugar units. Nonlimiting examples of suitable polysaccharides include, but are not limited to, starches, chitosan, celluloses, chitin, gums, arabinans, galactans and mixtures thereof.

"Polysaccharide derivative" as used herein means that one or more of the original hydroxyl moieties present one or more monomer units (sugar units) of a pure polysaccharide has been replaced with a non-hydroxyl moiety.

"Heteropolysaccharide" as used herein means a polysaccharide that comprises different types of sugar units. For example, a heteropolysaccharide may comprise pentose sugar units and hexose sugar units. Further, a heteropolysaccharide may comprise different types of pentose sugar units and/or hexose sugar units.

"Heteropolysaccharide derivative" as used herein means one or more of the original hydroxyl moieties present one or more monomer units (sugar units, typically pentose and hexose sugar units) of a pure heteropolysaccharide has been replaced with a non-hydroxyl moiety. The heteropolysaccharide derivative may be a hemicellulose derivative. The heteropolysaccharide derivative may comprise a heteropolysaccharide backbone comprising one or more pentoses and/or one or more hexoses.

"Hemicellulose" as used herein means a heteropolysaccharide. Nonlimiting examples of sugar and/or sugar acid units found in hemicellulose include one or more of the following: pentoses, such as xylose, arabinopyranose and arabinofuranose; hexoses, such as glucose, mannose and galactose; hexuronic acids, such as glucuronic acid, methylglucuronic acid and galacturonic acid; and deoxy-hexoses, such as rhamnose and fucase. In one example, the hemicellulose of the present invention comprises a polysaccharide comprising a monomer selected from the group consisting of: D-glucose, D-glucuronic acid, D-mannose, D-arabinose, D-xylose, D-xylopyranose, D-glucopyranose, D-galactopyranose, L-arabinofuranose, D-mannopyranose, D-glucopyranosyluronic acid, β-D- xylose, β-D-glucose, β-D-glucuronic acid, β-D-mannose, α-L-rhamnose, α-L-arabinopyranose, α-L-fucase, α-L-arabinofuranose, α-D-4-O-methylglucuronic acid, α-D-galactose, α-D-galacturonic acid and mixtures thereof.

In one example, the hemicellulose of the present invention includes a polysaccharide selected from the group consisting of: xylan, glucuronoxylan, arabinoxylan, glucomannan, galactoglucomannan, xyloglucan and mixtures thereof.

A hemicellulose of the present invention may exhibit a degree of polymerization of less than about 2000 and/or less than about 1000 and/or less than about 500 and/or less than about 250 and/or less than about 100 to about 1 and/or to about 20 and/or to about 50. In one example, a hemicellulose of the present invention exhibits a degree of polymerization of from about 20 to about 100 and/or from about 20 to about 500 and/or from about 20 to about 250 and/or from about 50 to about 250 and/or from about 20 to about 100 and/or from about 50 to about 100.

A hemicellulose of the present invention may exhibit a weight average molecular weight of less than about 340,000 g/mol and/or less than about 200,000 g/mol and/or less than about 150,000 g/mol and/or less than about 100,000 g/mol and/or less than about 70 g/mol and/or less than about 50 g/mol and/or less than about 30,000 g/mol and/or less than about 20,000 g/mol and/or from less than about 15,000 g/mol to about 500 g/mol and/or to about 1,000 g/mol and/or to about 5,000 g/mol.

A hemicellulose of the present invention may be obtained by chemical and/or enzymatic processes known by those of ordinary skill in the art from a wood source, such as wood pulp, and/or from a non-wood source. Hemicellulose may be obtained from wood pulp from hardwood trees, such as tropical hardwood trees, for example eucalyptus and/or acacia trees. Hemicellulose may be obtained from wood pulp from softwood trees, such as northern softwood trees and/or southern softwood trees. Nonlimiting examples of non-wood sources of hemicellulose include corn hulls and/or corn brans.

"Hemicellulose derivative" as used herein means one or more of the original hydroxyl moieties present one or more monomer units (sugar units) of a pure hemicellulose has been replaced with a non-hydroxyl moiety.

"Non-hydroxyl moiety" is a chemical moiety other than solely —OH. Nonlimiting examples of suitable non-hydroxyl moieties include ester and/or ether moieties comprising fatty acid moieties, polyethylene glycol moieties, acetate moieties, acetate-butyrate moieties, methyl moieties, ethyl moieties, benzyl moieties, hydroxyethyl moieties and mixtures thereof. In one example, a non-hydroxyl moiety comprises a non-aromatic moiety. In one example, the non-hydroxyl moiety is a moiety that is derived from a fatty acid, such as a $C_4$-$C_{24}$, saturated or unsaturated, fatty acid. Nonlimiting examples of suitable fatty acids include hexanoic, octanoic, decanoic, lauric, myristic, palmitic, stearic, arachidic, palmioleic, oleic, ricinoleic, linoleic, eicosenoic or salts thereof, and mixtures thereof.

In another example, the non-hydroxyl moiety may be a plasticizer moiety; namely, a moiety that plasticizes the heteropolysaccharide derivative and/or reduces the Tg of the heteropolysaccharide moiety compared to the neat heteropolysaccharide and/or previous heteropolysaccharide derivative from with the plasticized heteropolysaccharide derivative was obtained. Nonlimiting examples of plasticizer moieties include moieties comprising fatty acids and/or polyethylene glycols.

In still another example, the non-hydroxyl moiety may comprise a moiety selected from the group consisting of: water-resistant moieties, strength moieties, superabsorbent moieties and mixtures thereof. A nonlimiting example of a water-resistant moiety is a moiety derived from an acetate. Nonlimiting examples of strength moieties include moieties derived from alginate, amylose, glucose, carboxymethylcellulose, polyvinylalcohol, polylactic acid, polyhydroxyalkanoate and mixtures thereof. Nonlimiting examples of superabsorbent moieties include moieties derived from acrylate, alginate, carboxymethylcellulose and mixtures thereof.

"Non-aromatic moiety" is a chemical moiety other than solely —OH and that is void of an aromatic ring. Accordingly, a non-aromatic moiety does not include a styrene moiety and/or a benzene moiety.

"Degree of Substitution" as used herein means the average number of original hydroxyl moieties that have been substituted with non-hydroxyl moieties per monomer (sugar) unit.

"Non-naturally occurring" as used herein with respect to "non-naturally occurring fiber" means that the fiber is not found in nature in that form. In other words, some chemical processing of materials needs to occur in order to obtain the non-naturally occurring fiber. For example, a wood pulp fiber is a naturally occurring fiber, however, if the wood pulp fiber is chemically processed, such as via a lyocell-type process, a solution of cellulose is formed. The solution of cellulose may then be spun into a fiber. Accordingly, this spun fiber would be considered to be a non-naturally occurring fiber since it is not directly obtainable from nature in its present form.

"Naturally occurring" as used herein means that a fiber and/or a material is found in nature in its present form. An example of a naturally occurring fiber is a wood pulp fiber.

A "fibrous structure" as used herein means a single web structure that comprises at least one heteropolysaccharide derivative fiber. For example, a fibrous structure of the present invention may comprise one or more fibers, wherein at least one of the fibers comprises a heteropolysaccharide derivative fiber, such as a non-naturally occurring heteropolysaccharide derivative fiber. In another example, a fibrous structure of the present invention may comprise a plurality of fibers, wherein at least one (sometimes a majority, even all) of the fibers comprises a heteropolysaccharide derivative fiber, such as a non-naturally occurring heteropolysaccharide derivative fiber. The fibrous structures of the present invention may be layered such that one layer of the fibrous structure may comprise a different composition of fibers and/or materials from another layer of the same fibrous structure.

"Fiber" as used herein means a slender, thin, and highly flexible object having a major axis which is very long, compared to the fiber's two mutually-orthogonal axes that are perpendicular to the major axis. Preferably, an aspect ratio of the major's axis length to an equivalent diameter of the fiber's cross-section perpendicular to the major axis is greater than 100/1, more specifically greater than 500/1, and still more specifically greater than 1000/1, and even more specifically, greater than 5000/1.

The fibers of the present invention may be continuous or substantially continuous. A fiber is continuous if it extends 100% of the MD length of the fibrous structure and/or fibrous structure and/or sanitary tissue product made therefrom. In one example, a fiber is substantially continuous if it extends greater than about 30% and/or greater than about 50% and/or greater than about 70% of the MD length of the fibrous structure and/or sanitary tissue product made therefrom. In another example, continuous or substantially continuous fiber in accordance with the present invention may exhibit a length of greater than 3.81 cm (1.5 inches).

The fiber can have a fiber diameter as determined by the Fiber Diameter Test Method described herein of less than about 100 microns and/or less than about 50 microns and/or less than about 20 microns and/or less than about 10 microns and/or less than about 8 microns and/or less than about 6 microns to about 1 micron and/or to about 2 microns and/or to about 3 microns.

The fibers may include melt spun fibers, dry spun fibers and/or spunbond fibers, staple fibers, hollow fibers, shaped fibers, such as multi-lobal fibers and multicomponent fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, trilobal and other various eccentricities.

"Sanitary tissue product" as used includes but is not limited to a wiping implement for post-urinary and post-bowel movement cleaning (toilet tissue), for otorhinolaryngological discharges (facial tissue), and multi-functional absorbent, cleaning uses (absorbent towels), wipes, feminine care products and diapers.

A sanitary tissue product of the present invention comprises at least one fibrous structure in accordance with the present invention. In one example, a fibrous structure and/or sanitary tissue product according to the present invention exhibits an initial total wet tensile of at least about 8 g/2.54 cm (8 g/in) and/or at least about 10 g/2.54 cm (10 g/in) and/or at least about 15 g/2.54 cm (15 g/in) and/or at least about 20 g/2.54 cm (20 g/in) and/or at least about 40 g/2.54 cm (40 g/in).

In another example, a fibrous structure and/or a sanitary tissue product of the present invention exhibits an initial total wet tensile, of less than about 500 g/2.54 cm (500 g/in) and/or less than about 400 g/2.54 cm (400 g/in) and/or less than about 300 g/2.54 cm (300 g/in) and/or less than about 200 g/2.54 cm (200 g/in) and/or less than about 150 g/2.54 cm (150 g/in) and/or less than about 120 g/2.54 cm (120 g/in) and/or less than about 100 g/2.54 cm (100 g/in).

In yet another example, a fibrous structure and/or a sanitary tissue product of the present invention may exhibit an initial total wet tensile of from about 8 g/2.54 cm (8 g/in) to about 500 g/2.54 cm (500 g/in) and/or from about 40 g/2.54 cm (40 g/in) to about 500 g/2.54 cm (500 g/in) and/or from about 60 g/2.54 cm (60 g/in) to about 500 g/2.54 cm (500 g/in) and/or from about 65 g/2.54 cm (65 g/in) to about 450 g/2.54 cm (450 g/in) and/or from about 70 g/2.54 cm (70 g/in) to about 400 g/2.54 cm (400 g/in) and/or from about 75 g/2.54 cm (75 g/in) to about 400 g/2.54 cm (400 g/in) and/or from about 80 g/2.54 cm (80 g/in) to about 300 g/2.54 cm (300 g/in) and/or from about 80 g/2.54 cm (80 g/in) to about 200 g/2.54 cm (200 g/in) and/or from about 80 g/2.54 cm (80 g/in) to about 150 g/2.54 cm (150 g/in) and/or from about 80 g/2.54 cm (80 g/in) to about 120 g/2.54 cm (120 g/in) and/or from about 80 g/2.54 cm (80 g/in) to about 100 g/2.54 cm (100 g/in).

In one example, a fibrous structure and/or a sanitary tissue product according to the present invention exhibits a minimum total dry tensile of at least about 70 g/2.54 cm (70 g/in) and/or at least about 100 g/2.54 cm (100 g/in) and/or at least about 300 g/2.54 cm (300 g/in) and/or at least about 500 g/2.54 cm (500 g/in) and/or at least about 700 g/2.54 cm (700 g/in) and/or at least about 800 g/2.54 cm (800 g/in) and/or at least about 900 g/2.54 cm (900 g/in) and/or at least about 1000 g/2.54 cm (1000 g/in).

In another example, a fibrous structure and/or a sanitary tissue product according to the present invention exhibits a maximum total dry tensile of less than about 5000 g/2.54 cm (5000 g/in) and/or less than about 4000 g/2.54 cm (4000 g/in) and/or less than about 2000 g/2.54 cm (2000 g/in) and/or less than about 1700 g/2.54 cm (1700 g/in) and/or less than about 1500 g/2.54 cm (1500 g/in).

In even another example, a fibrous structure and/or a sanitary tissue product according to the present invention exhibits a wet lint score of less than about 25 and/or less than 20 and/or less than 15 and/or less than 10.

In yet another example, a sanitary tissue product according to the present invention exhibits a total dry tensile within a range of a minimum and maximum total dry tensile value as described above.

In still yet another example, a fibrous structure and/or a sanitary tissue product according to the present invention exhibits a Dry Lint Score of less than about 10 and/or less than about 8 and/or less than about 7 and/or less than about 6 and/or less than about 5.5.

In addition to sanitary tissue products, the fibrous structures of the present invention may be utilized in any number of various other applications known in the art. For example, in some examples, the fibrous structures may be utilized as packaging materials, wound dressings, etc.

"Ply" or "Plies" as used herein means a single fibrous structure optionally to be disposed in a substantially contiguous, face-to-face relationship with other plies, forming a multi-ply sanitary tissue product. It is also contemplated that a single fibrous structure can effectively form two "plies" or multiple "plies", for example, by being folded on itself. Ply or plies can also exist as films.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121. Unless otherwise specified, all molecular weight values herein refer to the weight average molecular weight.

Polysaccharide Derivative

In one example of the present invention, a polysaccharide derivative according to the present invention comprises a thermoplastic polysaccharide derivative.

In another example of the present invention, a polysaccharide derivative according to the present invention comprises a heteropolysaccharide derivative.

In yet another example of the present invention, a polysaccharide derivative according to the present invention comprises a thermoplastic heteropolysaccharide derivative.

In one example of the present invention, the polysaccharide derivative of the present invention exhibits a contact angle of less than about 60° and/or less than about 45° and/or from about 0° to about 60° and/or from about 15° to about 60° and/or from about 20° to about 45° as determined by the Contact Angle Test Method herein.

In another example of the present invention, the polysaccharide derivative of the present invention comprises a heteropolysaccharide that exhibits a contact angle of less than about 150° and/or less than about 120° and/or less than about 100° and/or from about 0° to about 150° and/or from about 0° to about 120° and/or from about 20° to about 120° and/or from about 60° to about 120° and/or from about 70° to about 120° and/or from about 75° to about 100° as determined by the Contact Angle Test Method herein.

In another example of the present invention, the polysaccharide derivative of the present invention exhibits a degree of substitution of less than 1.0 and/or less than about 0.8 and/or less than about 0.6 and/or less than about 0.4 and/or less than about 0.3 and/or less than about 0.25 and/or less than about 0.2 and/or less than about 0.15 and/or less than about 0.1 to about 0.

In yet another example of the present invention, the polysaccharide derivative exhibits a degree of polymerization of greater than 310 and/or greater than 320 and/or greater than 330 and/or greater than 340 and/or greater than 350 and/or less than about 2000 and/or less than about 1700 and/or less than about 1500.

In still yet another example of the present invention, the polysaccharide derivative exhibits a melting point of less than about 250° C. and/or less than about 230° C. and/or less than about 210° C. and/or less than about 190° C.

The polysaccharide and/or heteropolysaccharide from which the polysaccharide derivative and/or heteropolysaccharide derivative is derived may comprise one or more pentose units wherein the pentose unit may have the following formula:

wherein $R^3$ is independently selected from the group consisting of —H, —CH$_2$OH, —CH$_2$OC(O)CH$_3$, —CH$_3$, —C(O)OH and mixtures thereof; $R^1$ is independently selected from the group consisting of: —H, —CH$_3$, —C(O)CH$_3$, another pentose and mixtures thereof; $R^2$ is independently selected from the group consisting of: —H, —CH$_3$ and mixtures thereof; and n is 0 or 1. In one example of the pentose unit, $R^3$ is —H; $R^1$ is —H; $R^2$ is —H and n is 1. In another example of the pentose unit, $R^3$ is —CH$_2$OC(O)CH$_3$; $R^1$ is —C(O)CH$_3$; $R^2$ is —H and n is 1.

In one example, the polysaccharide derivative comprises a monomer unit having the formula:

wherein X is independently selected from the group consisting of —H, —CH$_2$OH, —CH$_2$OC(O)CH$_3$, —CH$_3$, —C(O)OH and mixtures thereof; $R^1$ is independently selected from the group consisting of: —H, —CH$_3$, —C(O)CH$_3$, another pentose and mixtures thereof; $R^2$ is —(CH$_2$CH$_2$O)$_m$—$R^4$ where $R^4$ is independently selected from H and CH$_3$ or —CH$_2$CH($R^5$)—C(O)OR$^6$ where $R^5$ is independently selected from CH$_3$ and CH$_2$C(O)OR$^7$ where $R^6$ and $R^7$ are independently selected from H and (CH$_2$CH$_2$O)$_m$—$R^4$; n is 1; and m is 1 to about 40.

In another example, the polysaccharide derivative comprises a monomer unit having the formula:

wherein X is independently selected from the group consisting of —H, —CH$_2$OH, —CH$_2$OC(O)CH$_3$, —CH$_3$, —C(O)OH and mixtures thereof; $R^1$ is independently selected from the group consisting of: —H, —CH$_3$, —C(O)CH$_3$, another pentose and mixtures thereof; $R^2$ is —C(O)R$^8$ where $R^8$ is a saturated or unsaturated alkyl chain containing from about 4 to about 24 carbon atoms; n is 1; and m is 1 to about 40.

In yet another example, the polysaccharide and/or heteropolysaccharide from which the polysaccharide derivative and/or heteropolysaccharide derivative is derived comprises one or more hexose units wherein the hexose unit may have the formula:

wherein $R^9$ is independently selected from the group consisting of: —H, —CH$_3$, —CH$_2$CH$_2$OC(O)CH$_3$ and mixtures thereof and $R^{10}$ is independently selected from the group consisting of: —H, —CH$_3$ and mixtures thereof. In one example of the hexose unit, $R^9$ is —H and $R^{10}$ is —H. In another example of the hexose unit, $R^9$ is —CH$_2$CH$_2$OC(O)CH$_3$ and $R^2$ is —H.

Process for Making a Polysaccharide Derivative

The polysaccharide derivative of the present invention may be made by any suitable process known to those skilled in the art.

In one example of the present invention, a process for making a polysaccharide derivative of the present invention comprises the step substituting one or more hydroxyl moieties present on one or more monomer units within a polysaccharide, such as a hemicellulose, with a non-hydroxyl moiety, such as a non-aromatic moiety, to form a polysaccharide derivative. The polysaccharide derivative formed by the process may exhibit the properties of the polysaccharide from which is was derived.

Nonlimiting Synthesis Examples

Example 1

Hemicellulose (O-acetyl-(4-O-methylglucurono)xylan commercially available from Aldrich Chemical Company, 18.0 g) is placed into a 250 mL round bottom flask fitted with a temperature probe, gas inlet adapter, and a stopper. 1-methyl-2-pyrrolidinone (125 mL) is added to the round bottom flask to produce a slurry of the hemicellulose and the 1-methyl-2-pyrrolidinone. The slurry is stirred under nitrogen.

Lauroyl chloride (15 mL) and pyridine (10 mL) are added to the slurry to form a mixture. The mixture is heated to about 80° C. and stirred under nitrogen for five hours. After cooling to room temperature (about 23° C.±2.2° C.), the mixture is slowly poured into 400 mL of methanol. Suction filtration is used to collect the solid formed after addition to the methanol. Methanol is used to rinse the solid further. The solid is then dried in a vacuum desiccator to afford 15.6 g of a light brown solid, a hemicellulose derivative.

Example 2

A homogenous mixture of lauric acid (36.5 g, 6.85 eq/OH), lauric acid salt (0.1 eq/OH, 0.5 g) and 6 g of deionized water (9 eq/OH) is obtained by stirring in a homogenizer at 1000 rpm for about 10 minutes at about 60° C. The mixture is poured over 5 g of hemicellulose (96% dry solid basis from Grain Processing Corporation, IA, lot number 4452-23-001-ADD1-1.12) for acetylation reaction. Water is distilled off at 130° C. for about 30 minutes in a glass reactor equipped with mechanical stirring and distilling device, to a content of about 0.1%. The acetylation reaction is carried at 190° C. for about five hours. The product is collected by suction filtration, washed with methanol, and then dried in a vacuum desiccator to afford 4.2 g of a light ivory solid, a hemicellulose derivative.

Polysaccharide Derivative-Containing Composition a. Polysaccharide Derivative

The polysaccharide derivative-containing composition of the present invention comprises a polysaccharide derivative. The polysaccharide derivative-containing composition exhibits properties suitable for spinning the composition into one or more non-naturally occurring fibers and/or forming a film. The polysaccharide derivative-containing composition may contain an amount of polysaccharide derivative that results in the non-naturally occurring fiber being produced from polysaccharide derivative-containing composition containing greater than about 10% and/or greater than about 20% and/or greater than about 30% by weight on a dry fiber basis as determined by the Polysaccharide Derivative Detection Test Method and/or Enzymatic Analysis Test Method described herein. In one example, the polysaccharide derivative-containing composition may comprise from greater than about 1% and/or greater than about 5% and/or greater than about 10% and/or greater than about 20% and/or greater than about 30% and/or greater than about 40% and/or greater than about 50% and/or greater than about 60% and/or up to about 100% and/or up to about 99.85% and/or up to about 99% and/or up to about 97% and/or up to about 95% and/or up to about 90% and/or up to about 85% and/or up to about 80% by weight of the composition of a polysaccharide derivative.

b. Properties of Polysaccharide Derivative-Containing Composition

In one example, the polysaccharide derivative-containing composition exhibits a shear viscosity according to the Shear Viscosity Test Method described herein of less than about 35 Pascal·Seconds and/or less than about 30 Pascal·Seconds and/or less than about 25 Pascal·Seconds and/or less than about 20 Pascal·Seconds and/or less than about 10 Pascal·Seconds and/or to about 0.5 Pascal·Seconds and/or to about 1 Pascal·Seconds and/or to about 2 Pascal·Seconds and/or to about 3 Pascal·Seconds as measured at a shear rate of 3,000 sec$^{-1}$ and at a temperature of between 50° C. to 100° C.

In another example, the polysaccharide derivative-containing composition exhibits a Capillary Number of greater than 1 and/or greater than about 3 and/or greater than about 5 such that the polysaccharide derivative-containing composition can be effectively processed into a non-naturally occurring polysaccharide derivative fiber.

The Capillary number is a dimensionless number used to characterize the likelihood of a droplet of a composition breaking up. A larger capillary number indicates greater fluid stability upon exiting a die used to spin the composition into a non-naturally occurring fiber. The Capillary Number (Ca) is defined as follows:

$$Ca = \frac{V * \eta}{\sigma}$$

V is the fluid velocity at the die exit (units of Length per Time),
η is the fluid viscosity at the conditions of the die (units of Mass per Length*Time),
σ is the surface tension of the fluid (units of mass per Time$^2$).
When velocity, viscosity, and surface tension are expressed in a set of consistent units, the resulting Capillary Number will have no units of its own; the individual units will cancel out.

The Capillary Number is defined for the conditions at the exit of the die. The fluid velocity is the average velocity of the fluid passing through the die opening. The average velocity is defined as follows:

$$V = \frac{Vol'}{Area}$$

Vol'=volumetric flowrate (units of Length$^3$ per Time),
Area=cross-sectional area of the die exit (units of Length$^2$).
When the die opening is a circular hole, then the fluid velocity can be defined as $$V = \frac{Vol'}{\pi * R^2}$$

R is the radius of the circular hole (units of length).

The fluid viscosity will depend on the temperature and may depend of the shear rate. The definition of a shear thinning fluid includes a dependence on the shear rate. The surface tension will depend on the makeup of the fluid and the temperature of the fluid.

In one example of a fiber spinning process, the non-naturally occurring fibers need to exhibit an initial stability as they leave the die. The Capillary Number is used to characterize this initial stability criterion. At the conditions of the die, the Capillary Number should be greater than 1 and/or greater than about 3 and/or greater than about 5 and/or up to about 70 and/or up to about 60 and/or up to about 50.

In one example, the polysaccharide derivative-containing composition exhibits a Capillary Number of from at least 1 to about 50 and/or at least 3 to about 50 and/or at least 5 to about 30.

Further, the polysaccharide derivative-containing composition may exhibit a pH of from at least about 4 to about 12 and/or from at least about 4.5 to about 11.5 and/or from at least about 4.5 to about 11.

In one example, the polysaccharide derivative-containing composition exhibits a temperature of from about 30° C. to about 190° C. and/or from about 35° C. to about 150° C. and/or from about 40° C. to about 130° C. and/or from about 40° C. to about 120° C.

In one example, the polysaccharide derivative-containing composition is a homogeneous composition. In another example, the polysaccharide derivative-containing composition is a dispersion of solid additives, such as fibers or microfibrils, within a polysaccharide derivative-containing melt. The solid additives may comprise a polysaccharide, such as cellulose.

Polysaccharide Derivative Fiber

The polysaccharide derivative-containing composition of the present invention, may be processed into a non-naturally occurring polysaccharide derivative fiber by any suitable process known to those of ordinary skill in the art. Nonlimiting examples of suitable processes include meltblowing, spunbonding and solvent spinning Nonlimiting examples of dies that can be used for spinning of the polysaccharide derivative-containing composition into a fiber are known by those of skill in the art. One example of a suitable die is described in U.S. Pat. No. 7,018,188, which is incorporated herein by reference. One example of a suitable die manufacturer is Biax-Fiberfilm Corporation of Greenville, Wis.

In one example, the non-naturally occurring polysaccharide derivative fiber of the present invention comprises greater than 30% and/or greater than about 40% and/or greater than about 50% and/or greater than about 60% and/or up to about 100% and/or up to about 95% and/or up to about 90% and/or up to about 85% and/or up to about 80% by weight on a dry fiber basis of polysaccharide derivative.

In addition to polysaccharide derivative, the non-naturally occurring polysaccharide derivative fiber of the present invention may comprise additives, such as other polysaccharides, that were present in the polysaccharide derivative-containing composition from which the non-naturally occurring fiber is produced. The cellulose may be in the form of microfibrils that provide reinforcement to the non-naturally occurring polysaccharide derivative fiber.

The polysaccharide derivative fiber of the present invention may exhibit a fiber diameter of less than about 100 microns and/or less than about 50 microns and/or less than 25 microns and/or less than about 20 microns and/or less than about 10 microns and/or less than about 8 microns and/or less than about 6 microns to about 1 micron and/or to about 2 microns and/or to about 3 microns as measured according to the Fiber Diameter Test Method.

Processing the Polysaccharide Derivative-Containing Composition into a Non-Naturally Occurring Fiber The polysaccharide derivative-containing composition described above may be processed into a non-naturally occurring polysaccharide derivative fiber by any suitable method known to those of ordinary skill in the art. For example, the polysaccharide derivative-containing composition may be subjected to a fiber spinning operation. Nonlimiting example of fiber spinning operations include spunbonding, melt blowing, continuous fiber producing and/or tow fiber producing, and/or solvent spinning.

Fiber spinning may be a dry spinning operation wherein a spinning composition is spun into air or some other gas or a wet spinning operation where the spinning composition is spun into a coagulating bath. One example of a dry spinning operation is a solvent spinning operation wherein a solvent-containing composition is processed into a fiber by spinning the composition and concurrently removing the solvent during fiber formation. The solvent may be eliminated from the polysaccharide derivative-containing composition and/or non-naturally occurring fiber produced therefrom by volatilizing and/or diffusing it out of the composition and/or fiber.

In one example, a process for making a non-naturally occurring fiber comprises the step of producing a fiber comprising greater than 30% and/or greater than about 40% and/or greater than about 50% and/or greater than about 60% and/or up to about 100% and/or up to about 95% and/or up to about 90% and/or up to about 85% and/or up to about 80% by weight on a dry fiber basis of polysaccharide derivative. In another example, the step of producing a non-naturally occurring fiber comprising a polysaccharide derivative comprises spinning a polysaccharide derivative-containing composition, which contains an amount of polysaccharide derivative that results in the fiber being produced from the composition having greater than 30% and/or greater than about 40% and/or greater than about 50% and/or greater than about 60% and/or up to about 100% and/or up to about 95% and/or up to about 90% and/or up to about 85% and/or up to about 80% by weight on a dry fiber basis of polysaccharide derivative, into a fiber.

Figure 1:
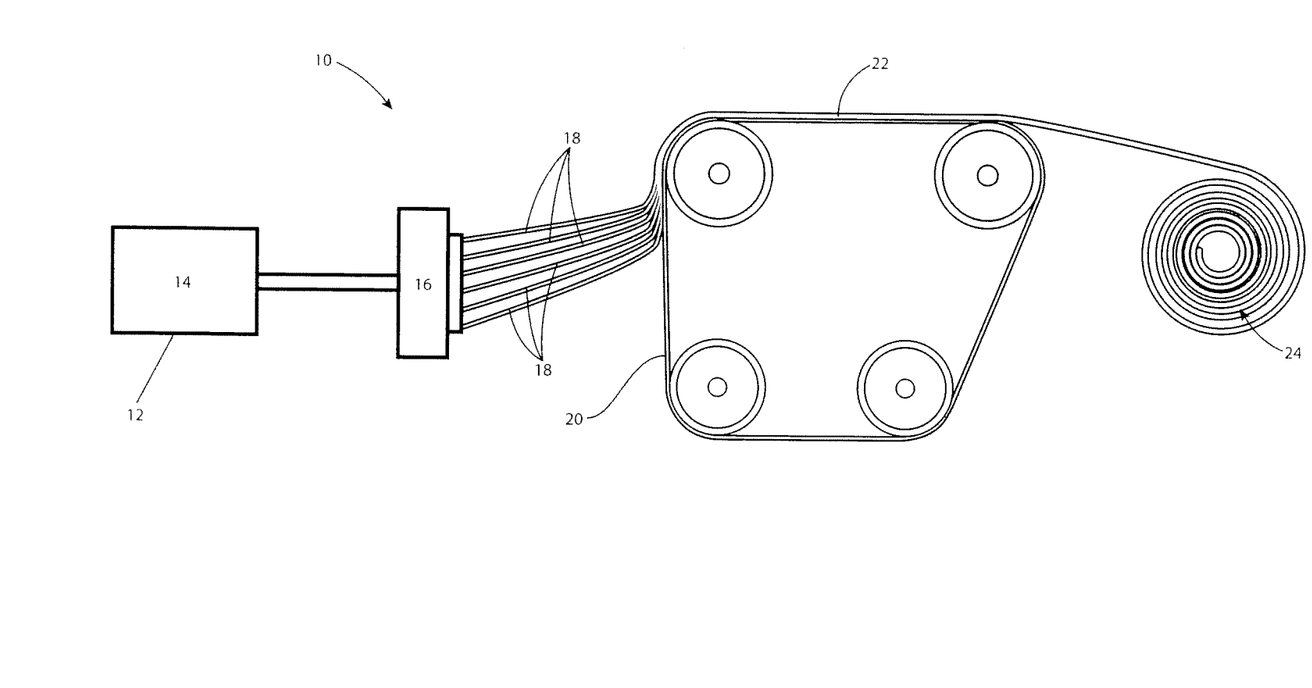
FIG. 1 is a schematic representation of a process for making a fibrous structure according to the present invention.

As shown in FIG. 1, an example of a fiber spinning operation 10 comprises an extruder 12 where a polysaccharide derivative-containing composition 14 suitable for spinning into a fiber is prepared. The polysaccharide derivative-containing composition 14 is then transferred to a spinnerette 16. The spinnerette 16 receives the polysaccharide derivative-containing composition 14 and then spins non-naturally occurring polysaccharide derivative fibers 18.

Nonlimiting examples of spinning temperatures for the polysaccharide derivative-containing composition can range from about 105° C. to about 300° C., and in some embodiments can be from about 130° C. to about 230° C. and/or from about 150° C. to about 210° C. and/or from about 150° C. to about 190° C. The spinning processing temperature is determined by the chemical nature, molecular weights and concentration of each component.

In one example, fiber spinning speeds for spinning the non-naturally occurring polysaccharide derivative fibers is greater than about 5 m/min and/or greater than about 7 m/min and/or greater than about 10 m/min and/or greater than about 20 m/min. In another example, the fiber spinning speeds are from about 100 to about 7,000 m/min and/or from about 300 to about 3,000 m/min and/or from about 500 to about 2,000 m/min.

The non-naturally occurring polysaccharide derivative fiber may be made by fiber spinning processes characterized by a high draw down ratio. The draw down ratio is defined as the ratio of the fiber at its maximum diameter (which is typically occurs immediately after exiting the capillary of the spinnerette in a conventional spinning process) to the final diameter of the formed fiber. The fiber draw down ratio via either staple, spunbond, or meltblown process will typically be 1.5 or greater, and can be about 5 or greater, about 10 or greater, or about 12 or greater.

In the process of spinning fibers, particularly as the temperature is increased above 105° C., typically it is desirable for residual water levels to be 1%, by weight of the fiber, or less, alternately 0.5% or less, or 0.15% or less to be present in the various components.

The spinneret capillary dimensions can vary depending upon desired fiber size and design, spinning conditions, and polymer properties. Suitable capillary dimensions include, but are not limited to, length-to-diameter ratio of 4 with a diameter of 0.35 mm.

In one example, the amount of polysaccharide derivative-containing composition flowing through the spinnerette and being spun into fibers may be from at least about 0.1 grams/hole/minute (g/h/m) and/or from about 0.1 g/h/m to about 20 g/h/m and/or from about 0.1 g/h/m to about 15 g/h/m and/or from about 0.2 g/h/m to about 10 g/h/m and/or from about 0.2 g/h/m to about 8 g/h/m.

The residence time of the polysaccharide derivative-containing composition in the spinnerette and/or extruder can be varied so as to not degrade the polysaccharide derivative. For example, if it is desired to add a high melting temperature thermoplastic polymer to the polysaccharide derivative-containing composition before spinning, then the high melting temperature polymer may be subjected to a temperature for an amount of time is the absence of the polysaccharide derivative. The polysaccharide derivative may then be added immediately before spinning of the polysaccharide derivative-containing composition into a fiber.

Continuous fibers can be produced through, for example, spunbond methods or meltblowing processes. Alternately, non-continuous (staple fibers) fibers can be produced according to conventional staple fiber processes as are well known in the art. The various methods of fiber manufacturing can also be combined to produce a combination technique, as will be understood by those skilled in the art.

As will be understood by one skilled in the art, spinning of the fibers and compounding of the components can optionally be done in-line, with compounding, drying and spinning being a continuous process.

After spinning the polysaccharide derivative-containing composition into a non-naturally occurring polysaccharide derivative fiber, the fiber may be dried and/or crosslinked and collected on a collection belt to form a fibrous structure comprising a non-naturally occurring polysaccharide derivative fiber.

The polysaccharide derivative within the fiber may be crosslinked to itself and/or to other polysaccharides and/or polysaccharide derivatives within the fiber.

The fibrous structure may be subjected to a post-processing operation, such as embossing, thermal bonding and/or calendaring.

d. Forming a Fibrous Structure

As shown in FIG. 1, after spinning, the non-naturally occurring polysaccharide derivative fibers 18 are collected on a collection device, such as a belt, especially a moving belt 20, to form a fibrous structure 22. During the fibrous spinning operation 10, two or more different spinnerettes may be used to deposit non-naturally occurring fibers onto the collection device and/or onto non-naturally occurring fibers already present on the collection device.

The fibrous structure 22 may be subject to post-processing operations such as embossing, calendaring, printing and/or tuft-generation.

The fibrous structure 22 may convolutedly wound to form a roll 24. The fibrous structure 22 may be combined with another ply of the same or different fibrous structure to form a multi-ply sanitary tissue product.

A plurality of non-naturally occurring polysaccharide derivative fibers formed as a result of spinning a polysaccharide derivative-containing composition according to the present invention may be collected on a collection device, such as a moving belt in order to form a fibrous structure. Other fibers may be combined with the non-naturally occurring polysaccharide derivative fibers prior to, concurrently and/or after the non-naturally occurring polysaccharide derivative fibers contact the collection device. The collection device may comprise a molded member that imparts a three-dimensional pattern to the fibrous structure. The three-dimensional pattern may comprise a non-random, repeating pattern.

The polysaccharide derivative fibers of the present invention may be bonded or combined with other non-naturally occurring fibers and/or naturally occurring fibers to make fibrous structures. The non-naturally occurring fibers, such as polylactic acid fibers and/or other high molecular weight polymers, and/or naturally occurring fibers, such as cellulosic wood pulp fibers, may be associated with the fibrous structure comprising polysaccharide derivative fibers during the forming process of polysaccharide derivative fiber-containing fibrous structure and/or as discrete layers of non-naturally occurring fibers and/or naturally occurring fibers.

In one example, the spun polysaccharide derivative fibers of the present invention may be collected using conventional godet winding systems and/or through air drag attenuation devices. If the godet system is used, the fibers can be further oriented through post extrusion drawing at temperatures from about 50° to about 200° C. The drawn fibers may then be crimped and/or cut to form non-continuous fibers (staple fibers) used in a carding, air-laid, or fluid-laid process.

Test Methods

Unless otherwise indicated, all tests described herein including those described under the Definitions section and the following test methods are conducted on samples that have been conditioned in a conditioned room at a temperature of 73° F.+/−4° F. (about 23° C.+/−2.2° C.) and a relative humidity of 50%+/−10% for 24 hours prior to the test. Further, all tests are conducted in such conditioned room. Tested samples and felts should be subjected to 73° F.+/−4° F. (about 23° C.+/−2.2° C.) and a relative humidity of 50%+/−10% for 24 hours prior to testing.

Polysaccharide Derivative Detection Test Method

The presence of a polysaccharide derivative in a sample, such as a fiber, a film or another structure, is determined by analyzing the sample's hexosan and/or pentosan content. For example, TAPPI Method T 223 cm-01, Pentosans (e.g., xylose, arabinopyranose, etc.) in wood and pulp, may be used to determine quantitatively the pentosan content of a fiber.

In order to determine the hexosan and/or pentosan content of a sample, the sample is digested with acid to hydrolyze any sugar bonds within the polysaccharide derivative of the sample to form a solution and/or dispersion. The hexosan and/or pentosan, especially the pentosan, content of the solution and/or dispersion is measured colorimetrically after adding an orcinol-ferric chloride reagent to the solution and/or dispersion.

Contact Angle Test Method

The contact angle of a material, such as a polysaccharide derivative of the present invention, is measured by first forming a film of the material. The film can then be measured using TAPPI T-458 method in which a small drop of liquid (water or ink) is placed on the surface of the sample and the angle between the drop and the sample surface is measured. Optical magnification, electronic recording and the like are commonly used to enhance the ease of measurement.

Enzymatic Analysis Test Method

Polysaccharide derivative content can be measured by using enzymatic analysis. For example, a heteropolysaccharide derivative content, such as a hemicellulose derivative content, may be analyzed using a hemicellulase enzyme (e.g., *Aspergillus niger* Hemicellulase, Sigma-Aldrich H2125). Similarly, a polysaccharide derivative content, such as a cellulose derivative content, may be analyzed using a cellulase enzyme (e.g., *Aspergillus niger* Cellulase, Sigma-Aldrich C1184).

Shear Viscosity of a Polysaccharide Derivative-Containing Composition Test Method The shear viscosity of a polysaccharide derivative-containing composition is measured using a capillary rheometer, Goettfert Rheograph 6000, manufactured by Goettfert USA of Rock Hill S.C., USA. The measurements are conducted using a capillary die having a diameter D of 1.0 mm and a length L of 30 mm (i.e., L/D=30). The die is attached to the lower end of the rheometer's 20 mm barrel, which is held at a die test temperature of 75° C. A preheated to die test temperature, 60 g sample of the polysaccharide derivative-containing composition is loaded into the barrel section of the rheometer. Rid the sample of any entrapped air. Push the sample from the barrel through the capillary die at a set of chosen rates 1,000-10,000 seconds$^{-1}$. A shear viscosity can be calculated with the rheometer's software from the pressure drop the sample experiences as it goes from the barrel through the capillary die and the flow rate of the sample through the capillary die. The log(shear viscosity) can be plotted against log(shear rate) and the plot can be fitted by the power law, according to the formula
$\eta = K\gamma^{n-1}$, wherein K is the material's viscosity constant, n is the material's thinning index and $\gamma$ is the shear rate. The reported shear viscosity of the composition herein is calculated from an interpolation to a shear rate of 3,000 sec$^{-1}$ using the power law relation.

Fiber Diameter Test Method

A fibrous structure comprising a polysaccharide derivative fiber of appropriate basis weight (approximately 5 to 20 grams/square meter) is cut into a rectangular shape, approximately 20 mm by 35 mm. The sample is then coated using a SEM sputter coater (EMS Inc, PA, USA) with gold so as to make the fibers relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 µm/pixel. Images will typically show a distinct bimodal distribution in the intensity histogram corresponding to the fibers and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.3) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeletonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of fiber diameters contained in the image.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A non-naturally occurring fiber comprising greater than 30% by weight on a dry fiber basis of a heteropolysaccharide derivative derived by replacing one or more of the original hydroxyl moieties present on one or more monomer units of a pure heteropolysaccharide with a non-hydroxyl moiety, wherein the non-hydroxyl moiety comprises a non-aromatic moiety is selected from the group consisting of ester moieties comprising fatty acid moieties, ether moieties comprising fatty acid moieties, polyethylene glycol moieties, acetate moieties, acetate-butyrate moieties, methyl moieties, ethyl moieties, hydroxyethyl moieties, and mixtures thereof wherein the heteropolysaccharide exhibits a degree of substitution of less than 1.0.

2. The fiber of claim 1 wherein the fiber comprises a fiber diameter of less than about 100 microns as measured according to the Fiber Diameter Test Method.

3. The fiber of claim 1 wherein the heteropolysaccharide derivative exhibits a contact angle of less than about 150° as determined by the Contact Angle Test Method.

4. The fiber of claim 3 wherein the heteropolysaccharide derivative exhibits a contract angle of less than about 60° as determined by the Contact Angle Test Method.

5. The fiber of claim 1 wherein the heteropolysaccharide derivative comprises a hemicellulose derivative.

6. The fiber of claim 1 wherein the fatty acid moiety is derived from a $C_4$-$C_{24}$ fatty acid.

7. The fiber of claim 6 wherein the fatty acid moiety is derived from a fatty acid selected from the group consisting of: hexanoic, octanoic, decanoic, lauric, myristic, palmitic, stearic, arachidic, palmioleic, oleic, ricinoleic, linoleic, eicosenoic and mixtures thereof.

8. A fibrous structure comprising a non-naturally occurring fiber according to claim 1.

9. The fibrous structure of claim 8 wherein the fibrous structure is a sanitary tissue product.

10. The fibrous structure of claim 9 wherein the sanitary tissue product is a multi-ply sanitary tissue product.

11. A non-naturally occurring fiber comprising greater than 30% by weight on a dry fiber basis of a heteropolysaccharide derivative derived by replacing one or more of the original hydroxyl moieties present on one or more monomer units of a pure heteropolysaccharide with a non-hydroxyl moiety, wherein the non-hydroxyl moiety comprises a non-aromatic moiety is-selected from the group consisting of ester moieties comprising fatty acid moieties, ether moieties comprising fatty acid moieties, polyethylene glycol moieties, acetate moieties, acetate-butyrate moieties, methyl moieties, ethyl moieties, hydroxyethyl moieties, and mixtures thereof, wherein the fiber comprises a fiber diameter of less than about 100 microns as measured according to the Fiber Diameter Test Method.

12. The fiber of claim 11 wherein the heteropolysaccharide derivative exhibits a contact angle of less than about 150° as determined by the Contact Angle Test Method.

13. The fiber of claim 12 wherein the heteropolysaccharide derivative exhibits a contract angle of less than about 60° as determined by the Contact Angle Test Method.

14. The fiber of claim 11 wherein the heteropolysaccharide derivative comprises a hemicellulose derivative.

15. The fiber of claim 11 wherein the fatty acid moiety is derived from a $C_4$-$C_{24}$ fatty acid.

16. The fiber of claim 15 wherein the fatty acid moiety is derived from a fatty acid selected from the group consisting of: hexanoic, octanoic, decanoic, lauric, myristic, palmitic, stearic, arachidic, palmioleic, oleic, ricinoleic, linoleic, eicosenoic and mixtures thereof.

17. A fibrous structure comprising a non-naturally occurring fiber according to claim 11.

18. The fibrous structure of claim 17 wherein the fibrous structure is a sanitary tissue product.

* * * * *